United States Patent [19]
Henderson et al.

[11] Patent Number: 5,719,983
[45] Date of Patent: Feb. 17, 1998

[54] METHOD AND APPARATUS FOR PLACEMENT OF VIDEO DATA BASED ON DISK ZONES

[75] Inventors: John C. Henderson, Enola, Pa.; Larry E. Pelletier, Lisle, Ill.

[73] Assignee: Symbios Logic Inc., Fort Collins, Colo.

[21] Appl. No.: 579,029

[22] Filed: Dec. 18, 1995

[51] Int. Cl.$^6$ .................. H04N 5/781; H04N 7/10; H01J 13/00
[52] U.S. Cl. ............. 386/70; 386/125; 395/200.13; 348/7; 369/50; 369/32; 369/48
[58] Field of Search ................. 386/45, 69, 70, 386/125, 126, 108; 369/47, 48, 49, 50, 32, 51, 53, 54, 124, 13, 275.2, 288; 360/27; 348/7, 6, 8, 9, 12, 13; 455/4.2, 5.1; 364/514 A; 395/441, 442, 601, 616, 200.7, 200.08, 200.09, 200.13, 410

[56] References Cited

U.S. PATENT DOCUMENTS

| | | | |
|---|---|---|---|
| 4,016,603 | 4/1977 | Ottesen . | |
| 4,352,165 | 9/1982 | Hevenor, Jr. | 364/900 |
| 4,607,346 | 8/1986 | Hill | 364/900 |
| 5,142,521 | 8/1992 | Terashima et al. . | |
| 5,202,799 | 4/1993 | Hetzler et al. . | |
| 5,345,575 | 9/1994 | English et al. | 395/425 |
| 5,386,402 | 1/1995 | Iwata | 369/32 |
| 5,394,382 | 2/1995 | Hu et al. | 369/32 |
| 5,422,761 | 6/1995 | Anderson et al. | 360/47 |
| 5,455,721 | 10/1995 | Nemazie et al. | 360/51 |
| 5,506,825 | 4/1996 | Gushima et al. | 369/49 |
| 5,510,905 | 4/1996 | Birk . | |
| 5,517,631 | 5/1996 | Machado et al. | 395/438 |
| 5,530,557 | 6/1996 | Asit et al. . | |
| 5,559,764 | 9/1996 | Chen et al. | 369/30 |
| 5,568,180 | 10/1996 | Okamoto | 348/7 |
| 5,576,906 | 11/1996 | Fisher et al. | 360/77.08 |
| 5,581,724 | 12/1996 | Belsan et al. | 395/441 |
| 5,586,264 | 12/1996 | Belknap et al. | 395/200.08 |
| 5,592,612 | 1/1997 | Birk | 395/182.04 |
| 5,619,338 | 4/1997 | Nakai et al. | 386/70 |

OTHER PUBLICATIONS

J.R. Evans, et al., High–Performance Storage Device, Dec.1971, 2206–2207.
R.F. Arnold, et al., DASD Space Allocation, Oct. 1977, 1709.
Robert K. Abbott, et al., Scheduling I/O Requests with Deadlines: A Performance Evaluation.
Carl Staelin, et al., Clustering Active Disk Data to Improve Disk Performance, Sept. 1900, 1–17.
Bruce L. Worthington, et al., Scheduling Algorithms for Modern Disk Drives, 1994, 241–51.

*Primary Examiner*—Andrew Faile
*Assistant Examiner*—Aung S. Moe
*Attorney, Agent, or Firm*—Duke W. Yee; Wayne P. Bailey

[57] ABSTRACT

A method and apparatus for storing data on a storage device in which the storage device has a plurality of different zones. Each zone in the storage device has a different transfer rate. The present invention places a video having the highest demand in a zone having the greatest transfer rate, wherein the data transfer of data for that video is maximized.

42 Claims, 11 Drawing Sheets

ZONE DATA LIST ENTRY FORMAT

| OFFSET (BYTES) | SIZE (BYTES) | DESCRIPTION |
|---|---|---|
| 0 | 2 | FIRST EXTENT IN REGION |
| 2 | 2 | BIT RATE |

720

METHOD AND APPARATUS FOR PLACEMENT OF VIDEO DATA BASED ON DISK ZONES

BACKGROUND OF THE INVENTION

1. Technical Field

The present invention relates generally to an improved data processing system and in particular to an improved data processing system for efficiently storing information in the form of videos. Still more particularly, the present invention relates to an improved method and apparatus for storing videos on a storage medium.

2. Description of the Related Art

With the advance of new compression technologies, the storing of video, audio, and user data into disk storage devices has become feasible. In addition, improvements in data transmission technologies provide sufficient bandwidth for multimedia traffic. As a result, applications such as video-on-demand (VOD), video editing, interactive games, home shopping, and other multimedia applications have been developed. Video-on-demand services may include, for example, movies, sporting events, textural information, educational programs, and arts programs.

A "multimedia application" is an application that uses different forms of communication as one application. For example, information can be displayed on a data processing system using voice, text, and video simultaneously. A multimedia data processing system allows text, graphics, images and audio to be displayed simultaneously. These types of multimedia applications are referred to collectively as "video", and it should be understood that a video generally includes both video and audio portions, although, in some instances, a video may only include an image portion as in textural information, or only in audio portion, as for example music.

The storage of video data on a storage device presents different problems then those associated with the storage of traditional data processing system data on a storage device. Video data has high bandwidth requirements and real time requirements not present with traditional data processing system data types. By careful placement of video data on the storage media in a storage device, the efficiency of storing video data can be enhanced. Current approaches to the placement of data on the storage media concentrate on real time requirements by optimizing seek times.

For example, U.S. Pat. No. 5,394,382, issued Feb. 28, 1995, to Hu, et al. focuses on a method of data placement organization that reduces the average seek time and the probability of maximum distance seeks of CD-ROM disks by combination of symmetric structuring, frequency-based data placement, and data replication. U.S. Pat. No. 5,345,375, issued Sep. 6, 1994, to English, et al. provides an indirect access storage device that reduces the performance impact of seek time and rotational delay. The use of large transfer sizes and multiple video streams of relatively low data rates characterized by current video-on-demand applications results in seek times becoming a second order effect compared to the transfer rate. "Seek time" is the time required to move a disk drive's read/write head to a specific location on disk, and "transfer rate" is the rate at which a circuit or a communications channel transfers information from a source to a destination, such as over a network or to and from a disk drive.

When the transfer rate of the device was only few times larger than the video rate, access times were an important factor in video storage placement. At most only a few video streams could be simultaneously retrieved from a storage media simultaneously and device arm movement and device latency were a first order effect in determining performance. As compression technology allows the stored video rate to decrease and as storage transfer rates increased due to improved device technologies and improved architectures such as disk striping, it has become practical to retrieve a large number of video streams from a storage device simultaneously. As the ratio between device transfer rate and the rate of an individual video stream increases, the number of video streams that can be simultaneously accessed becomes more a pure function of device bandwidth (transfer rate) and less a function of device access time. Therefore to increase the number of simultaneous video streams, device transfer rate must be optimized. As a result, it would be advantageous to have a method and apparatus for maximizing the transfer rate of video data.

SUMMARY OF THE INVENTION

The present invention provides a method and apparatus for storing data on a storage device in which the storage device has a plurality of different zones. The storage device may be, for example, an autonomous device such as a magnetic or optical disk or it may be logically made up of multiple physical devices as in a disk array. Each zone in the storage device has a different transfer rate. The present invention stores data based on the transfer rate of the zones and the demand for the data. The present invention places a video having the highest demand in a zone having the greatest transfer rate, wherein the data transfer of data for that video is maximized. Videos with lesser demands are placed in zones having lesser transfer rates.

The present invention also manages videos located on a storage device by identifying a change in demand for a video. In response to a change in demand for the video, the video is moved to another zone having a different transfer rate. The video is moved to a second zone having a higher transfer rate in response to an increase in demand for the video. In response to a decrease in demand for the video, the video is moved to a zone having a lower transfer rate.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
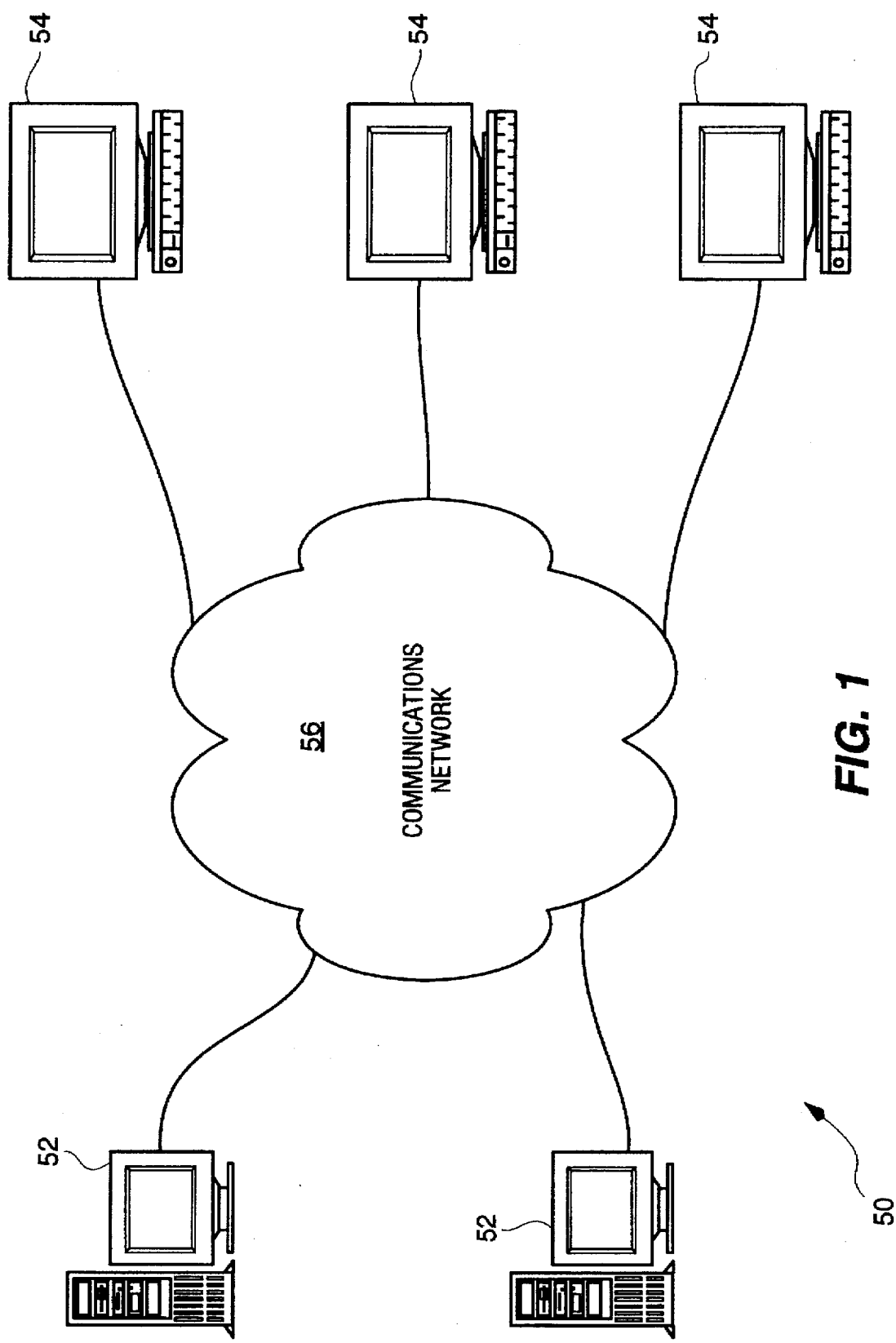
FIG. 1 is a distributed data processing system in which the present invention may be implemented.

With reference to FIG. 1, a distributed data processing system 50 in which the present invention may be implemented is depicted in accordance with a preferred embodiment of the present invention. Distributed data processing system 50 includes one or more data processing systems 52, user systems 54 distributed over a large geographical area, and a communications network 56. Generally, videos are transferred from data processing system 52 to user systems 54 over communications network 56. In addition, videos may be transferred between data processing systems 52.

The physical medium employed in communications network 56 for communicating between data processing system 52 and user system 54 can be, for example, a twisted pair of wires, a coaxial cable, a fiber optic cable, a microwave link, or a satellite link. The continuous physical path used for communicating is called a "circuit". The circuit includes a relatively small bandwidth "hi-directional" channel for communicating control signals and a relatively large bandwidth "downstream" channel for communicating video data. This circuit may include additional channels, for example, a medium bandwidth channel allocated for two-way communications such as telephone service may be employed.

In the depicted example, distributed data processing system 50 is a broadband communications system including Synchronized Optical Network (SONET), Asynchronous Transfer Mode (ATM), and Intelligent Networks (INs). Services available across distributed data processing system 50 may include home shopping, video games, and VOD. In addition to these, numerous other multimedia applications may be provided by broadband communications in distributed data processing system 50.

To support audio and video, video servers in distributed data processing system 50 must support vast amounts of data. For example, 10 minutes of uncompressed full motion video typically consumes 10 or 11 gigabytes of memory. Presently available compression standards, such as Joint Photographic Experts Group (JPEG) and Motion Picture Experts Group (MPEG) are employed to compress data. More information on communication networks involving broadband communications networks and architecture along with data transfer standards can be found in *Kumar, Broadband Communications: A Professional's Guide To ATM, Frame Relay, SMDS, SONET, and BISDN*, McGraw-Hill, Inc. (1995).

User systems 54 comprise an interface/controller box connected to the network and a viewing device such as a monitor or a television in the depicted example. Alternatively, the configuration of user systems 54 may be work stations.

Figure 2:
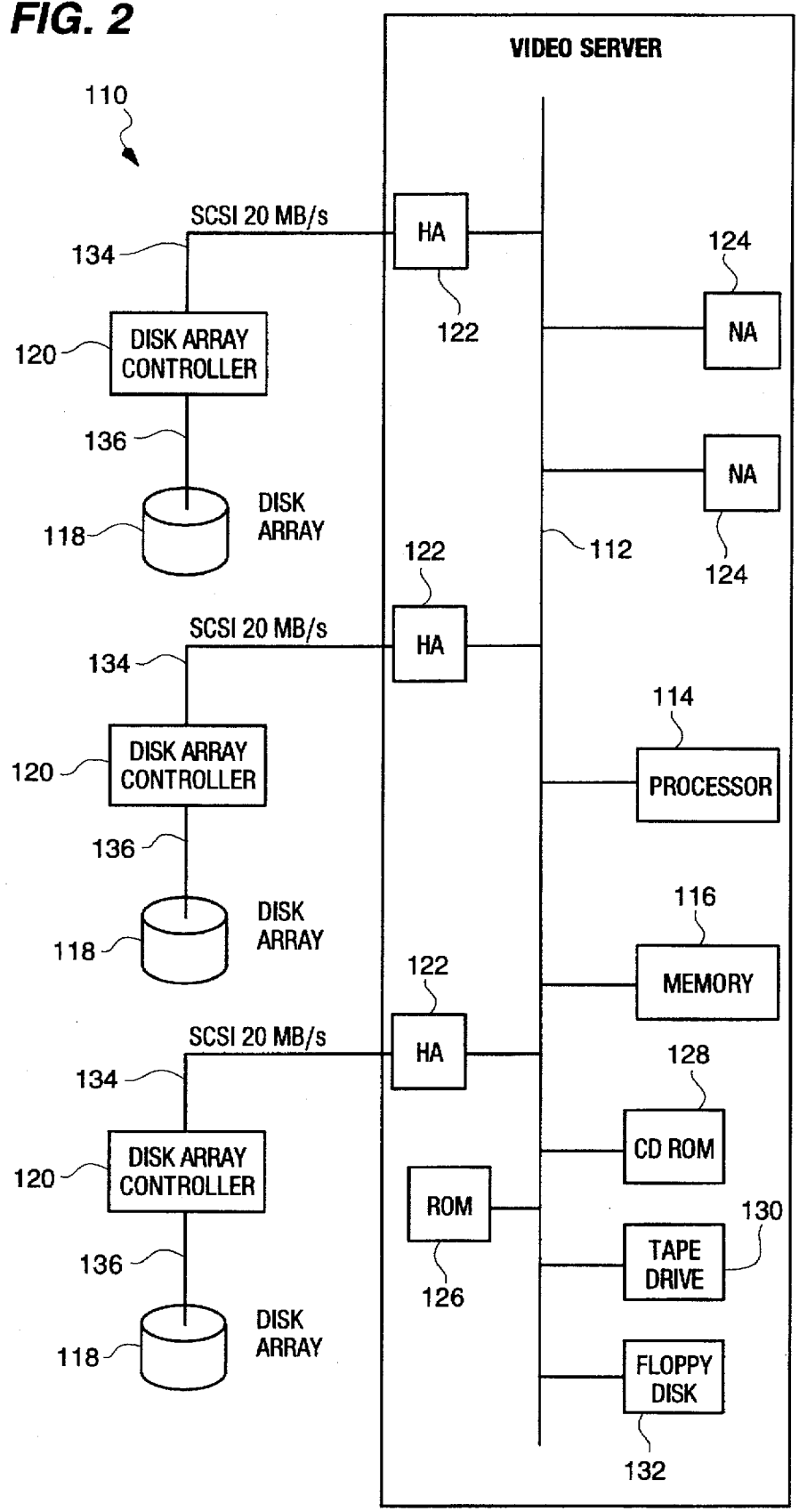
FIG. 2 is a block diagram of data processing system in which the present invention may be implemented.

With reference now to FIG. 2, a block diagram of data processing system is illustrated in which the present invention may be implemented. Video server 110 includes a system bus 112 connected to a processor 114 and a memory 116. Video server 110 also includes disk arrays 118. Disk arrays 118 are connected via Small Computer System Interface (SCSI) I/O buses 136 to disk array controllers 120, which are in turn connected to system bus 112 via host adapters (HA) 122 and SCSI I/O busses 134. Additionally, video server 110 contains network adapters (NA) 124, each having two connections, one connection to system bus 112 and another connection to a communications network (not shown). Video server 110 also contains read only memory (ROM) 126, which may include programs and data, such as, for example, the basic input/output system that provides transparent communications between different I/O devices. In the depicted example, video server 110 also includes other storage devices, such as, CD-ROM 128, tape drive 130, and floppy disk drive 132. Disk arrays 118 contain compressed video data for videos. Videos located on disk arrays 118 are sent to consumers located across a network by moving the video data from disk arrays 118 to system bus 112. From this location, the video data is moved to the network via network adapters 124. Multiple streams of video data, also called "video data streams", are sent to consumers across the network from video server 110.

The processes shown in FIGS. 4 and 8–11 may be implemented by those of ordinary skill in the art within the systems depicted in FIGS. 1 and 2. The processes of the present invention also may be implemented as a computer program product in a storage device that is readable by a data processing system, wherein the storage device encodes data processing executable instructions for executing the processes of the present invention. The storage device may take various forms including, for example, but not limited to a hard disk drive, a floppy disk, an optical disk, a ROM, RAM, and an EPROM, which are known to those skilled in the art. The processes stored on a storage device are dormant until activated by using the storage device with the data processing system.

For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions may be connected to the data processing system via a card or adapter connected to an I/O slot in the data processing system. Additionally, it is contemplated that the processes of the data processing system may be implemented within a storage device located in disk array controller 120 or host adapter 122.

Figure 3B:
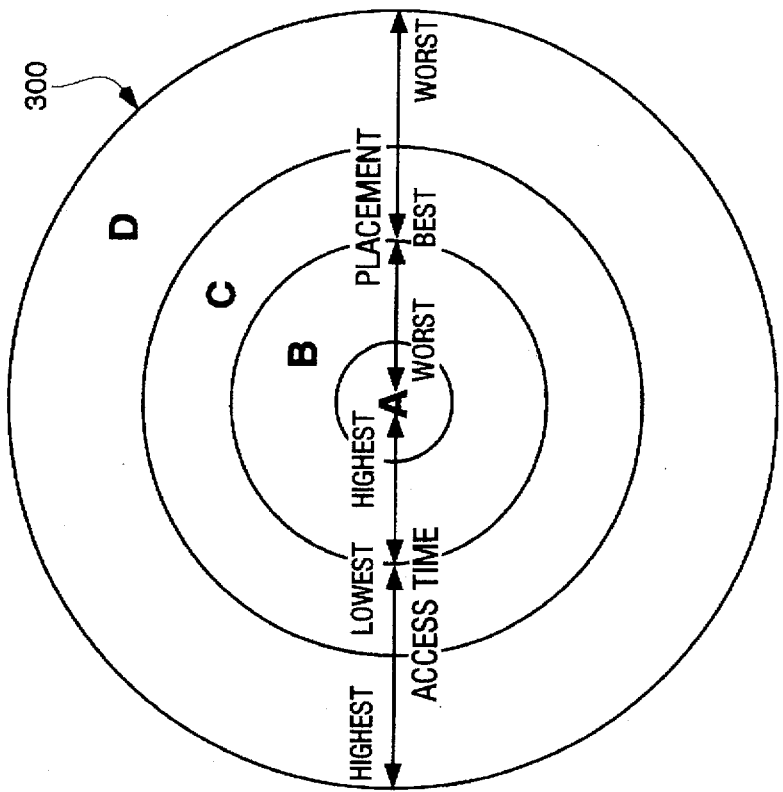
FIG. 3A and 3B are illustrations of disk zones with indications of transfer rates and access times according to the present invention.
Figure 3A:
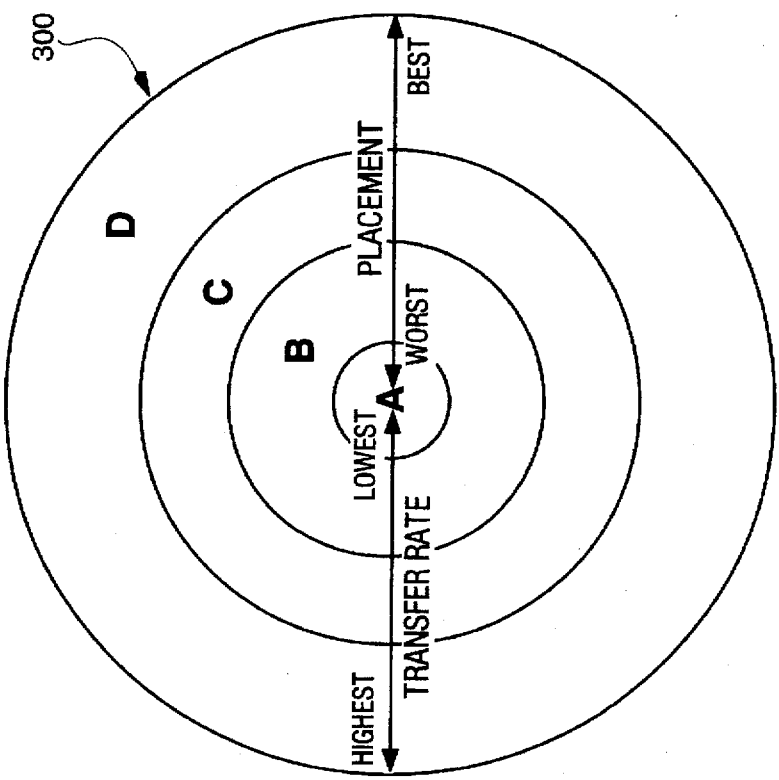

Turning now to FIGS. 3A and 3B, illustrations of disk zones with indications of transfer rates and access times are depicted according to the present invention. In FIG. 3A, disk 300 is divided into zones A, B, C, and D. The transfer rate of zone A is lower then that of zones B, C, or D. Zone D provides the highest transfer rate on disk 300. In FIG. 3B, disk 300, access times for zones A, C, A, and D are illustrated. As can be seen in FIG. 3B, zones A and D provide higher access times then zones B and C. Thus, if one were optimizing for access time, data used most often would be placed within zones B and C, rather then zones A and D. In contrast, in maximizing the transfer rate of data, video data should be placed on zones C and D rather then zones A and B to maximize the transfer rate. Thus, as can be seen with reference to FIGS. 3A and 3B, maximizing the transfer rate of data can result in longer access times.

The present invention provides a method and apparatus for placing video data in a manner that maximizes data transfer rates. The present invention provides a method for placing video data that maximizes data transfer rates by taking advantage of multiple streams of videos, video clip access frequency data, and zone-bit-recording (ZBR) characteristics of current disk drives. The present invention places the most frequency accessed video clips in the highest transfer-rate zones of the disk-drive to increase the number of current video streams that can be accessed. When the transfer rate is increased, more video streams may be provided. The present invention provides a method and apparatus for organizing video data on disk zones based on frequency of access, calculating the number of streams that can be supported by the transfer rate of a disk zone based on stream rates, collecting frequency of access data for use in data placement, migrating data into the most effective zone as used in such changes, and guiding initial placement of video data.

The present invention provides an improved process for video data migration, which sorts all the videos on the disk such that videos that are demanded most often are located or moved to the section of the disk having the highest transfer rates. Additionally, the processes of the present invention are designed to limit the number of times a video clip is moved when reorganizing the storage. The process results in free space being moved to the end of the disk. The present invention also determines whether free space is available. If free space is available, the process builds a memory based table to hold a representation of the way the current video clips are stored on the storage device. This table will become a working table to track the permutations of the storage device as the video clips are reorganized. A second table is built with identical information.

The process then sorts the videos in this second table by viewing frequency so that the videos are laid out such that the videos with the highest viewing frequency are placed within the disk zones with the highest transfer rates. This table becomes the target table representing the desired layout of the storage device after the reorganization is complete. The working table is updated at each step to reflect progress toward the desired layout as represented by the target table. While the number of concurrent transfers in process is less than S (the number of parallel data transfers taking place at one time) another transfer is started. To determine what transfer is made, a determination is made whether a video whose final designation lies in free space is present. If so, this video is chosen and the free space list is updated to reflect its movement. If a video is not present with a final destination that lies in free space, but free space is present that will remain free before and after the move, a video that is not already in its final location is moved into one of those spaces. Before a transfer begins, the correct space is allocated from the free space list. Additionally, the working table is marked to make sure the transfer is not performed twice simultaneously. After the transfer completes, the working table is updated to reflect the correct position of the transfer block and the old block is placed in the free space list. The reorganization is complete when the working table and the target table are identical.

Figure 4:
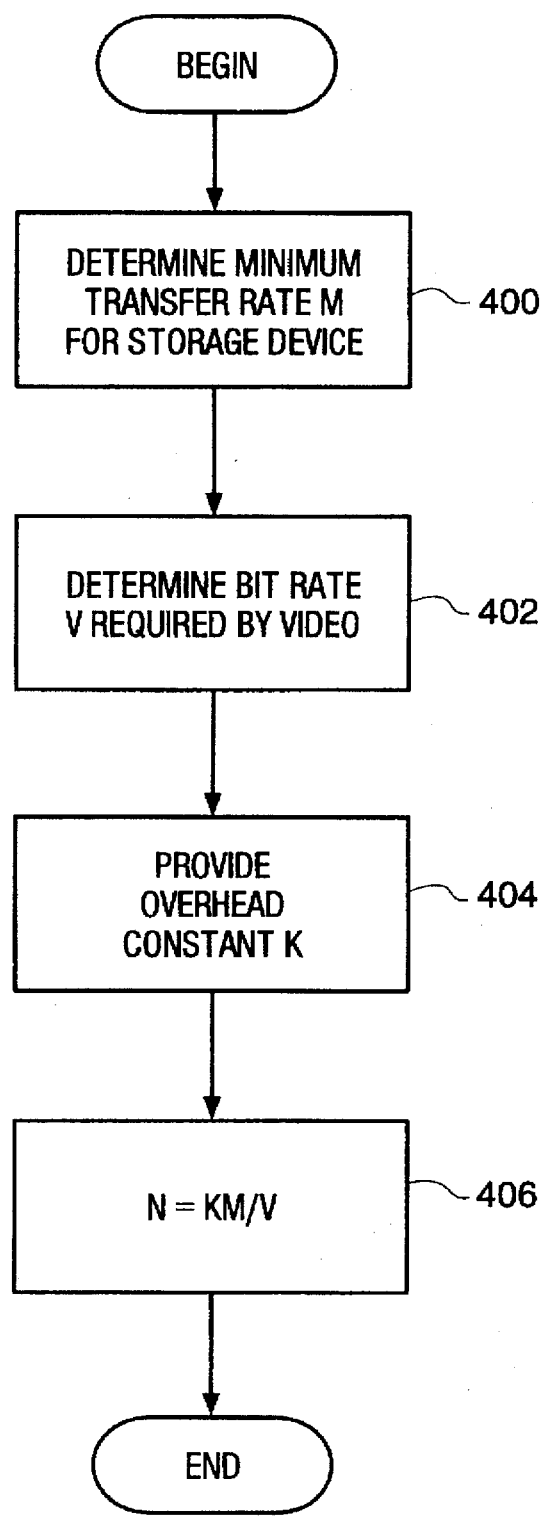
FIG. 4 is a flowchart of a process for determining the number of video streams that can be supported by a transfer rate of a disk zone according to the present invention.

With reference to FIG. 4, a flowchart of a process for determining the number of video streams that can be supported by a transfer rate of a disk zone is depicted according to the present invention. The process begins by determining the minimum transfer rate for the storage device disk zone on which the video is to be stored (step 400). The bit rate required by the video is then determined (step 402). A system overhead constant k is provided (step 404). The number of concurrent streams, N, is determined by km/v. The system overhead constant k consists of software processing time; average seek and latency times; bus arbitration,. connect, and disconnect times; and any other low-order effect system overhead. For any given system, constant k is usually determined through heuristics or measurement.

For example, if the transfer rate m for a zone is 5 megabytes per second (MB/sec) and the video rate v is 3 megabits per second (Mb/sec), and the system overhead constant k is 0.85, the number of concurrent streams N for that video clip is 11.3. Thus, that particular zone would be able to support 11 video streams. For a disk array with a stripe size of 4, and a zone transfer rate m of 20 MB/sec, a video bit rate v of 3 Mb/sec, and an overhead constant k of 0.8, the number of concurrent video streams that could be supported is 42.

Figure 5:
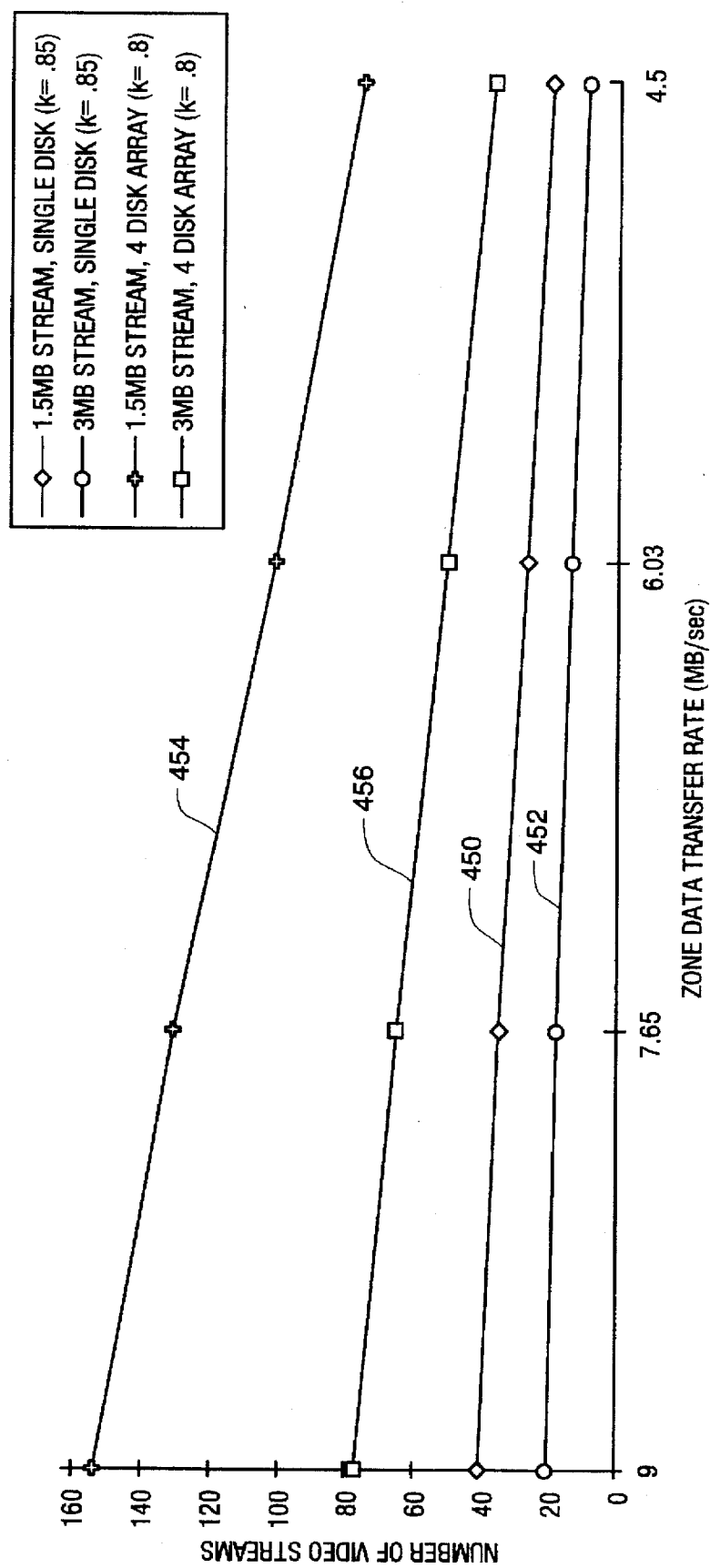
FIG. 5 is a graph of the number of video streams based on the zone data transfer rate according to the present invention.

Turning now to FIG. 5, a graph of the number of video streams based on the zone data transfer rate is depicted according to the present invention. Line 450 shows the number of video streams that can be supported for various zone data transfer rates using a 1.5 Mb stream with a system overhead constant k of 0.85. A 1.5 Mb stream is a video stream that has a video bit rate of 1.5 Mb/sec. Line 452 indicates the number of video streams that may be supported when the concurrent streams are 3 Mb streams having a system overhead constant k of 0.85. Line 454 shows the number of 1.5 Mb streams that may be supported in a four disk array having a system overhead constant k of 0.8. Line 456 shows the number of 3 MB video streams that can be supported on a four disk array having a system overhead constant k of 0.8. As can be seen with reference to FIG. 5, disk zones with higher transfer rates can support more video data streams. This is true for both single disks and disk arrays.

Figures 6, 7B:
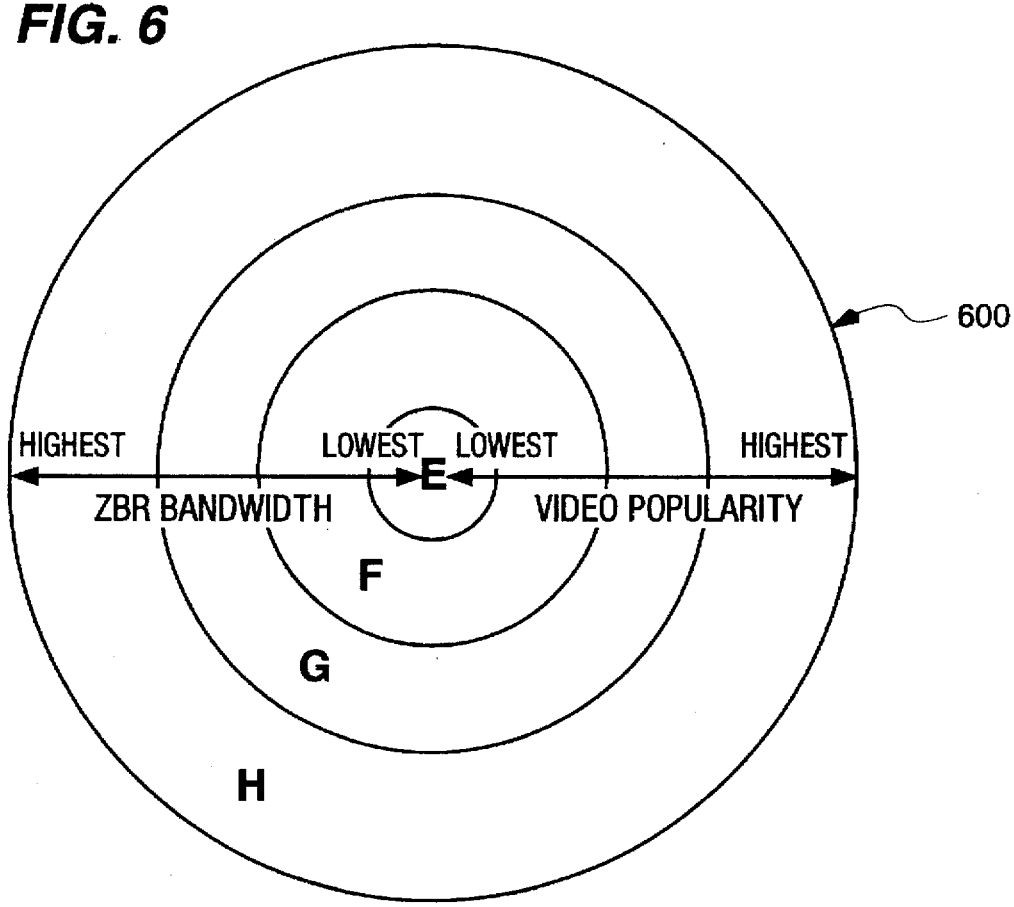
FIG. 6 is a diagram showing placement of videos based on video popularity according to the present invention.
FIG. 7B is an example of a format for storing ZBR data according to the present invention.

Turning now to FIG. 6, a diagram showing placement of videos based on video popularity is depicted according to the present invention. As can be seen, disk 600 include zones E, F, G, and H. The ZBR bandwidth is highest at the edges of disk 600 in zone H and is lowest at the center of disk 600 in zone E. According to the present invention, videos having the highest popularity are placed on the outer zones while videos having the lowest popularity or demand are placed on the inner zones of disk 600. Typically, the outer zones on a disk will have the higher transfer rates. Additionally, for most disks, the outer zones have the lowest addresses. Many presently available disks store data in similar densities throughout the various zones. With equal density, the outer portions of the disk will pass by the read/write head in a hard disk drive more quickly than the inner portions. Consequently, data transfer can be quicker on the outer edges of the disk. The process shown in FIGS. 4 and 8–11 may be implemented in many different ways. As previously mentioned they may be implemented in a computer, a disk array controller, or a host adapter. They may be implemented using services of an operating system such as UNIX as in the depicted example, or another commercial operating system, or a real-time operating system, or any other kind of control program. "UNIX" is a trademark of AT&T Bell Laboratories. These processes may be implemented as a file system as in the depicted example, or within a device or virtual device driver, or as a control program, or as hardware implementation.

In the present invention, these processes are implemented as a file system within the UNIX operating system. A file system controls the usage of storage on a set of storage devices. A storage device may represent a physical device such as a disk or tape or it may represent a logical device such as a disk array Or a logical volume. In the depicted example, the storage on the storage devices is allocated to "files", where each file is electronic representation of video, audio, text, image, etc. The granularity for allocation is known as an extent. An "extent" is a fixed-size, contiguous range of blocks within a storage device.

Figure 7A:
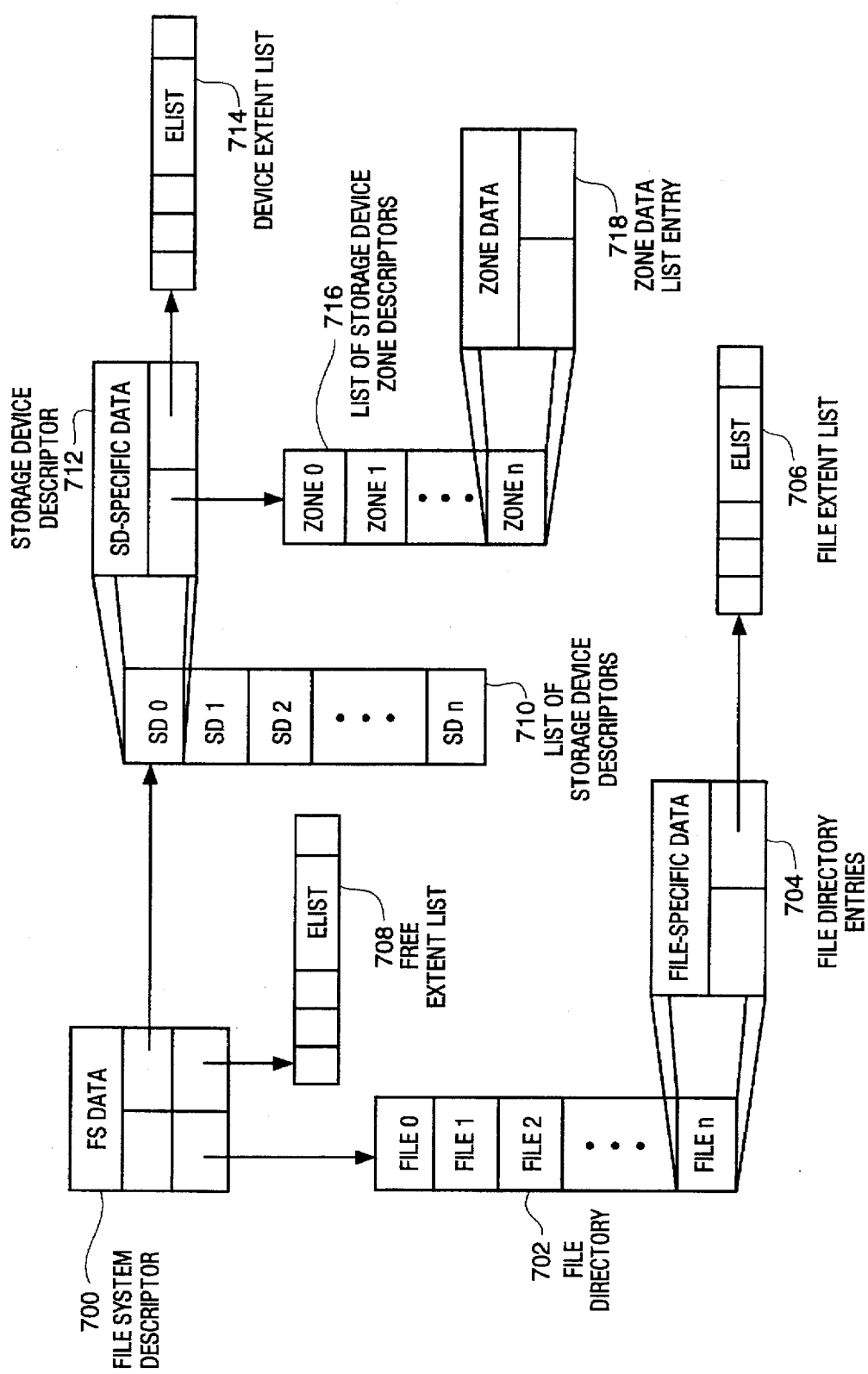
FIG. 7A is a diagram of example data structures used by the present invention.

Turning now to FIG. 7A, a diagram of data structures used by the present invention are depicted. As can be seen with reference to FIG. 7A, file system descriptor 700 provides a pointer to the file directory 702, which contains file directory entries for files 0 through n. Each file directory entry 704 contains information about the file such as, for example, the file name, file usage information, the required video bit rate, etc. Each entry also includes pointers to a file extent list 706, which records the sequence of extents allocated to the file. The extents allocated to a file are linked together as a linked list.

File system descriptor 700 also contains a pointer to the free extent list 708. All the extents not allocated to files are linked together in this list. File system descriptor 700 also provides a pointer to data structure 710, which is a list of storage device (SD) descriptors that contains information for descriptors for SDs 0 through n. Each storage device descriptor 712 contains storage device specific data, including pointers to the list of storage device zone descriptors 716, which has entries for device zones 0 through n and to the device extent list 714. The device extent list contains an entry for each extent on the storage device.

The zone data list entries 718 contained in list 716 contain transfer rates for different zones of the disk. This information can be used by the present invention. A zone data list entry data structure 720 is depicted in FIG. 7B, showing a format for storing ZBR data according to the present invention. As can be seen, an entry contains 2 bytes describing the starting block for the first extent in this zone (ZBR region). The second two bytes in this entry describe the disk transfer rate for this zone in bits per second. Each storage device descriptor 712 specifies data specific to a particular storage device, including the logical block number of the first block in the first extent.

ZBR data may not be available for all current drives or it may not be directly compatible without an inordinate amount of effort if the storage device is a RAID device. More information on RAID may be found in Patterson, et al., *A Case for Redundant Arrays of Inexpensive Disks (RAID)*, Proc. ACM SIGMOD, pages 109–116, June 1988. In this case, it is practical to determine by trial and error the ZBR mapping by employing multiple binary searches for the borders of the ZBR regions. Performing such a process during initialization time will not add significant overhead.

Video popularity may be determined by various methods. A historical analysis may be performed in which statistics are collected on the usage of videos by users. Each time a video is opened for access, a count is added to its directory entry. At an appropriate interval, "migration" is performed based on the collected counts, and the counts for the videos are reinitialized to zero at that time. "Migration" is the movement of data by copying from one location on the storage device to another location.

Video migration is employed to automatically reorder videos such that videos most in demand are moved to the sections of the disk with the highest transfer rate; i.e. the outer tracks. Additionally, in performing migration, a video should not cross logical unit boundaries if it can be avoided because doing so would reduce the number of video streams in both logical units instead of one.

Figure 8:
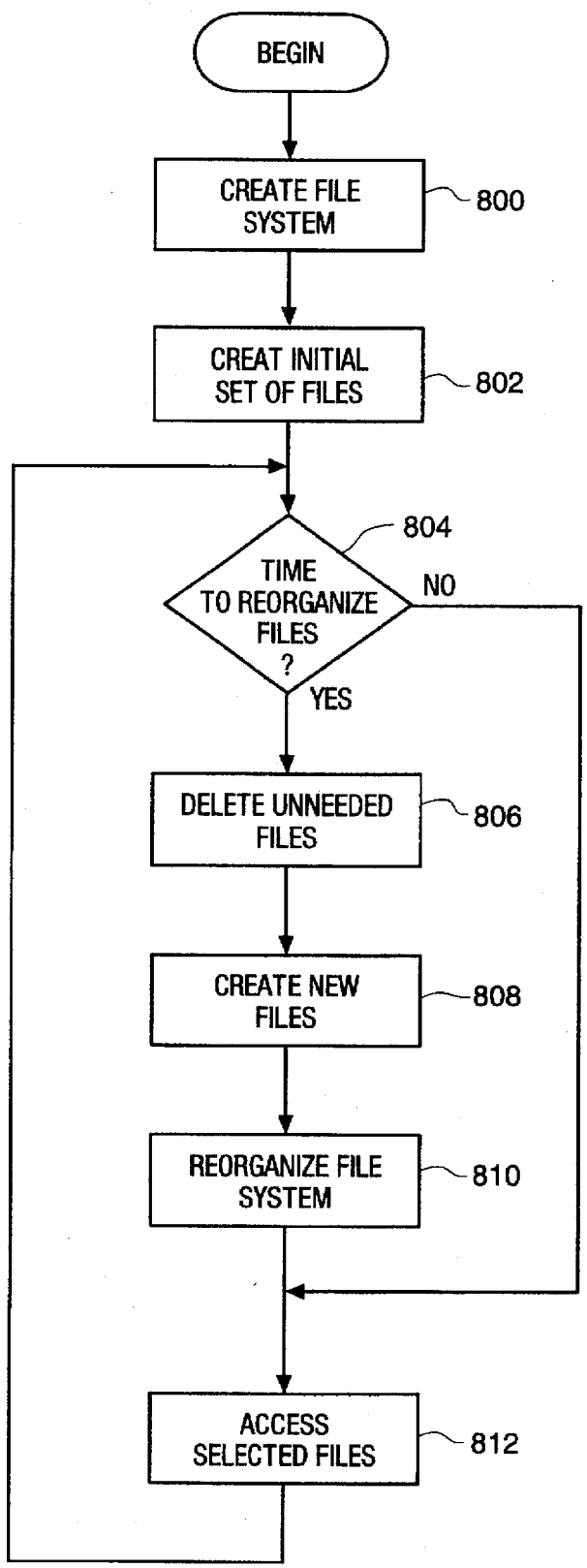
FIG. 8 is a flowchart of a process for placing and managing video data on a disk according to the present invention.

Turning now to FIG. 8, a flowchart of a process for placing and managing video data on a disk is depicted according to the present invention. The process begins by creating a file system (step 800). Thereafter, an initial set of files are created to populate the file system (step 802). The process then determines whether it is time to reorganize files (step 804). In a video system, video files are maintained and reorganized on a regular basis. At these times, videos that are no longer popular or that need to be removed for contractual or space needs are removed. New videos are added. This step is usually performed at a set time, such as once a day or once a week. If it is time to reorganize files, unneeded files are deleted (step 806). Thereafter, new files are created (step 808), and the file system is reorganized (step 810). Files are then accessed based on selections sent to the data processing system (step 812) with the process returning to step 804. With reference again to step 804, if it is not time to reorganize files, that is at all other times, access of files based on selections sent to the data processing system in step 812 occurs directly.

Figure 9:
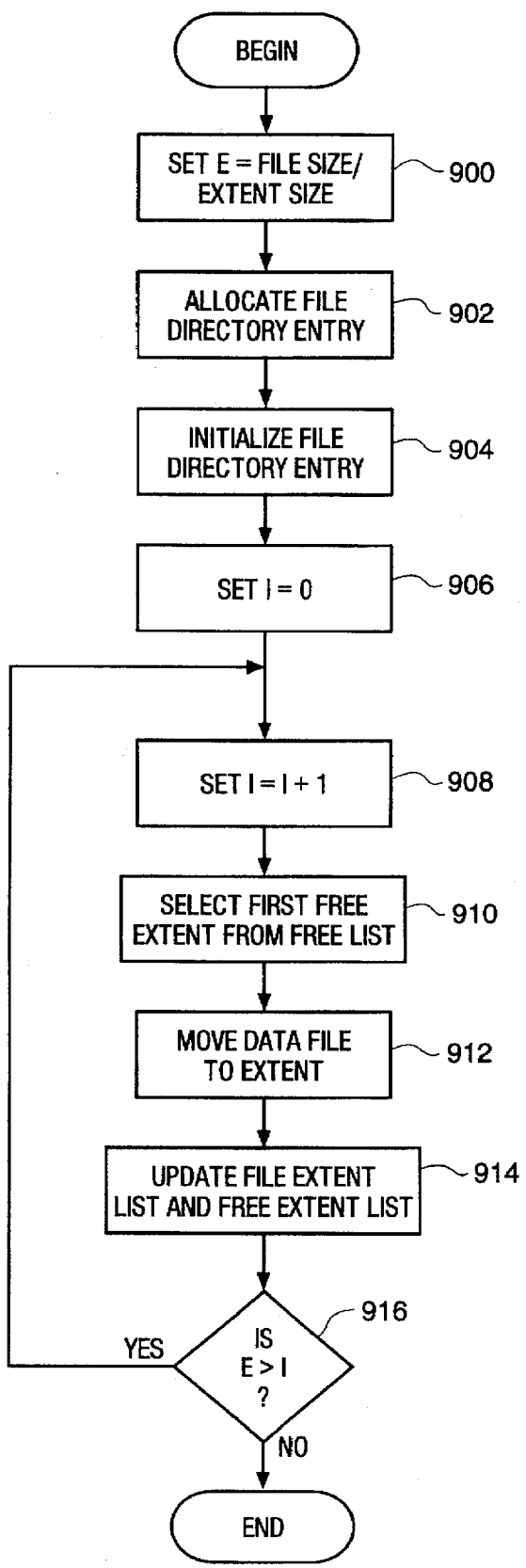
FIG. 9 is a process for creating files according to the present invention.

Turning now to FIG. 9, a process for creating files is depicted according to the present invention. This flowchart is a more detailed description of step 802 in FIG. 8. The process begins by setting a Variable E equal to the file size divided by extent size (step 900). The variable E represents the number of extents needed for this file. The process then allocates a file directory entry for the new file (step 902).

The file directory entry is then initialized (step 904). In particular, the file directory entry is initialized with various parameters, such as, for example, file_name, first_extent_pointer, last_extent_pointer, projected file_usages, required_video_byte_rate, etc. The process then sets a counter I=0 (step 906). The process then sets I=I+1 (step 908).

Thereafter, the first free extent in the free list is selected (step 910). The process then moves file data, usually from some external source, to the selected extent (step 912). The file extent list and the free extent list are updated (step 914). The process then determines whether E is greater than I (step 916). If E is greater than I, the process then returns to step 908. Otherwise, all needed extents have been allocated and the process terminates.

Figure 10:
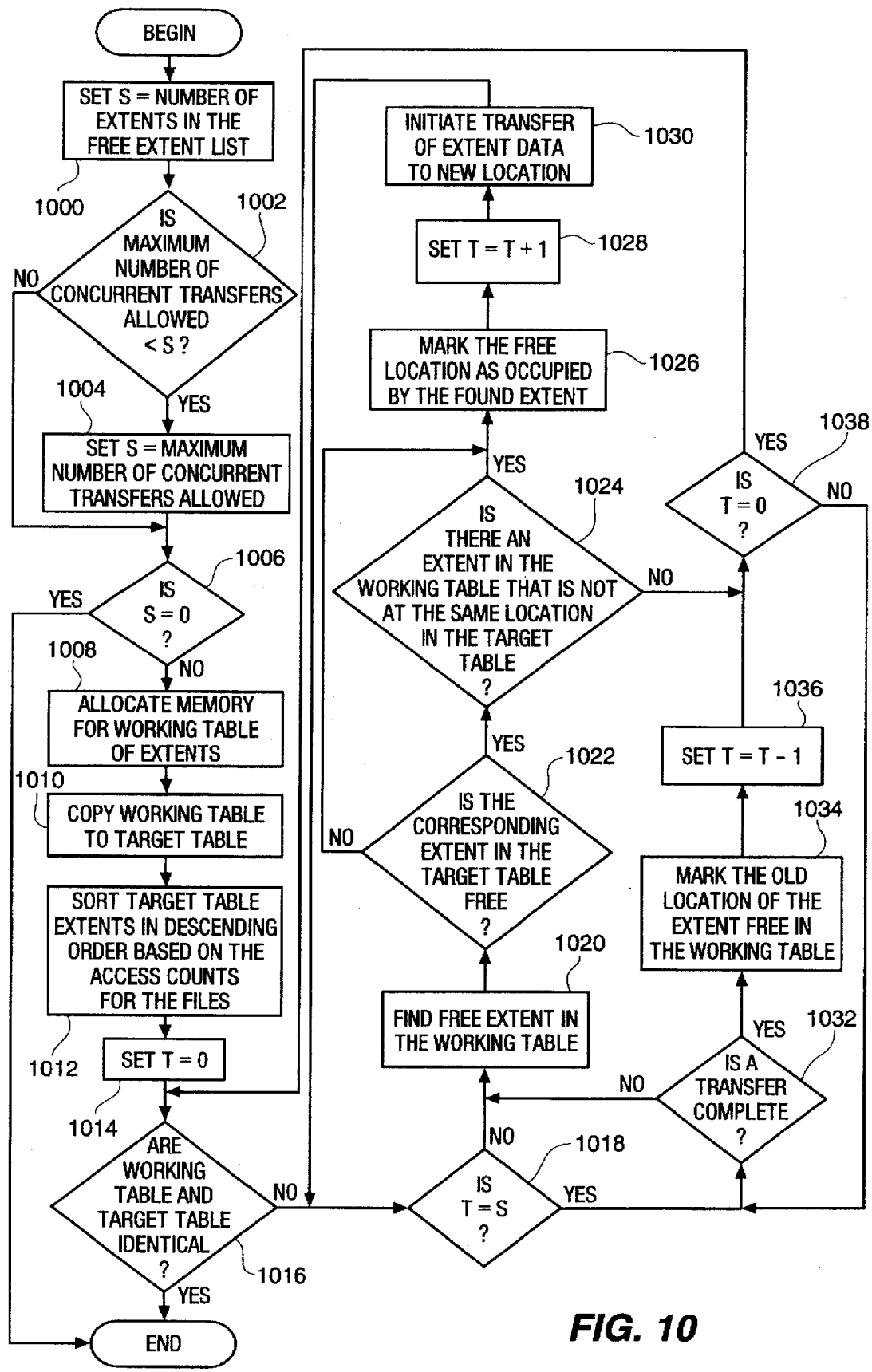
FIG. 10 is a process for reorganizing the file system according to the present invention.

With reference now to FIG. 10, a process for reorganizing the file system is depicted according to the present invention. This flowchart is a more detailed description of step 810 in FIG. 8. The process begins by setting a variable S equal to the number of extents in the free extent list (step 1000). The variable S specifies the number of parallel data transfers that will be taking place at one time. The free extent list (708 in FIG. 7) is a list of those extents on the storage device that are not currently holding extents associated with a file. The process then determines whether the maximum number of concurrent transfers allowed is less then S (step 1002). If the answer to this determination is yes, S is set equal to the maximum number of concurrent transfers allowed (step 1004). A determination is then made as to whether S is equal to zero (step 1006). With reference again to step 1002, if the maximum number of concurrent transfers allowed is not less then S, the process moves directly to step 1006 to determine whether S is equal to zero.

If S is not equal to zero, memory is allocated for the working table of extents (step 1008). The working table is copied to a target table (step 1010). The extents in the target table are sorted in descending order based on the access counts for the files (step 1012). The working table is a table or list of the file extents describing how the extents are mapped into physical locations on the storage devices. The target table becomes the desired order of the file extents. As the data is reorganized, the working table is modified until it is ordered the same as the target table. Next, T is set equal to zero (step 1014). A determination is made as to whether the working table and the target table are identical (step 1016). If the working table and the target table are not identical, the process determines whether T is equal to S (step 1018).

If T is not equal to S, a parallel transfer may be started so the process then finds a free extent in the working table (step 1020). The process then determines whether the corresponding extent in the target table is free (step 1022). If the corresponding extent in the target table is free, the process finds if there is an extent in the working table that is not the same location in the target table (step 1024). The free location is then marked as occupied by the extent found from either step 1022 or step 1024 (step 1026). With reference again to step 1022, if the corresponding extent in the target table is not free, the process proceeds directly to step 1026. T is set equal T+1 (step 1028). The process initiates a transfer of the extent data to the new locations (step 1030) with the process returning to step 1018.

With reference to step 1018, if T is equal to S, no more parallel transfers may be started. A determination is then made as to whether a parallel data transfer is complete (step 1032). If a transfer is complete, the process marks the old location of the extent free in the working table (step 1034). T is then set equal to T−1 (step 1036). Thereafter, a determination is made as to whether T is equal to zero (step 1038). If T is not equal to zero, more parallel transfers are still in progress. The process then proceeds to step 1032. If T is equal to zero, the process proceeds to step 1018. With reference again to step 1032, if there is not a complete parallel data transfer, the process proceeds to step 1020.

With reference again to step 1024, if there is not an extent in the working table that is not at the same location in the target table, then no more transfers need be initiated and the process proceeds to step 1038.

With reference again to step 1016, if the working table and the target table are identical, the process terminates. The process also terminates if in step 1006, S is equal to zero. In that case, reorganization could not take place at this time.

Figure 11:
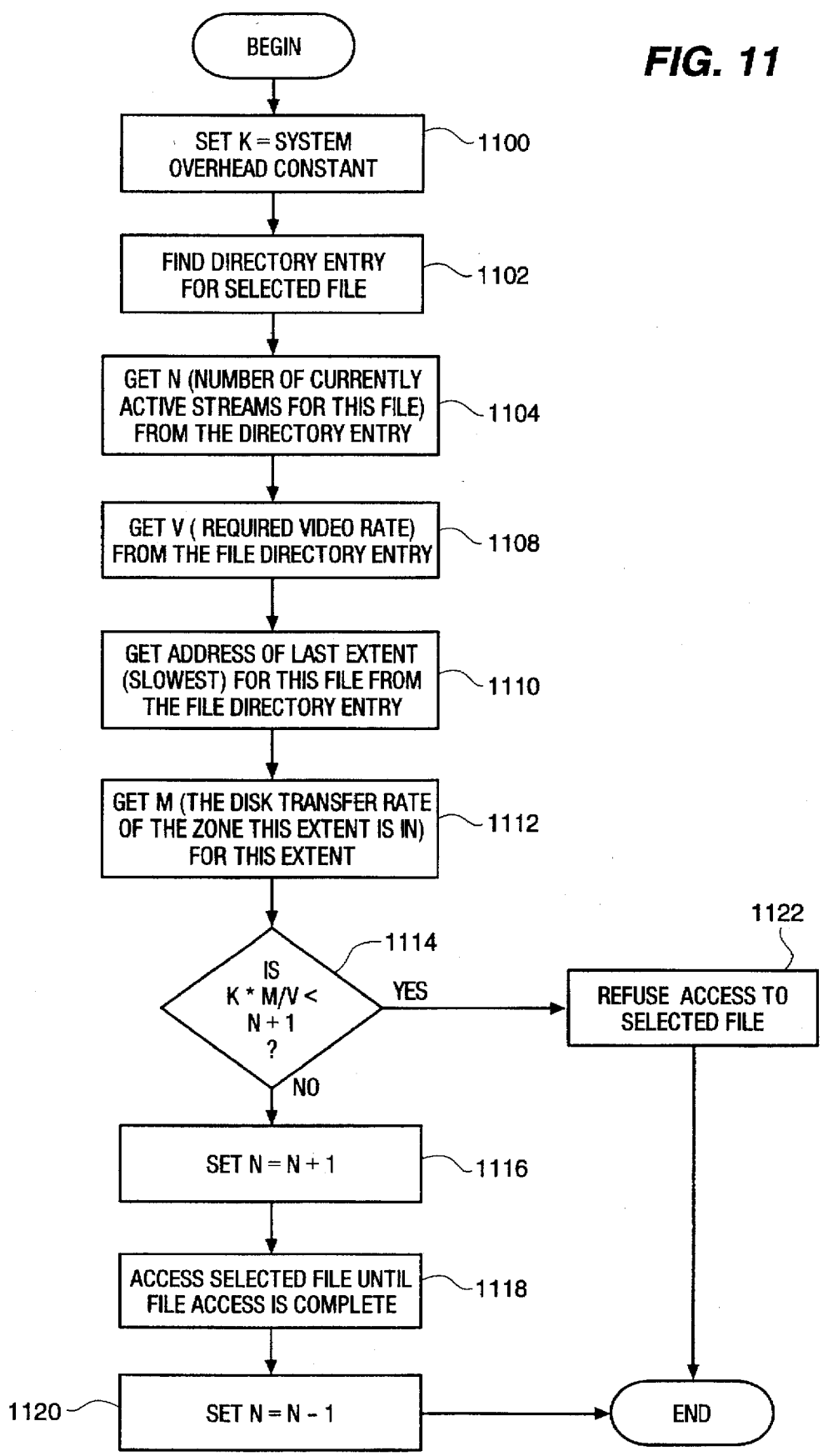
FIG. 11 is a process for accessing selected files according to the present invention.

Turning next to FIG. 11, a process for accessing selected files is depicted according to the present invention. This flowchart is a more detailed depiction of step 812 in FIG. 8. The process begins by setting a variable K equal to the system overhead constant (step 1100). The process then finds the directory entry for the selected file (step 1102). The number of currently active streams, N, for this file is obtained from the file directory entry (step 1104). The required video rate, V, is obtained from the file directory entry (step 1108). The address of the last extent for this file is obtained from the file directory entry (step 1110). This last extent is the slowest one. The disk transfer rate, M, of the zone for this extent is obtained (step 1112).

The process then determines whether K*M/V<N+1 (step 1114). If the determination is no, the process sets N equal to N+1 (step 1116). The process then accesses the selected file until a file access is complete (step 1118). N is then set equal to N−1 (step 1120) with the process terminating thereafter. With reference again to step 1114, if the answer to the determination is yes, the process then refuses to select the accessed file (step 1122). In this case, the number of video streams that can concurrently access this file (video) without exceeding the device bandwidth are already accessing this file. Therefore, this request is refused. It may be tried at another time after at least one of the current accesses is completed.

The present invention provides a unique method and apparatus for placing video on disks that maximizes data transfer rates. The number of concurrent video streams that can access video data is increased according to the present invention by placing the most frequently accessed videos in the highest ZBR zones of the disk drive. This provides an advantage over current approaches to placement of videos on storage media that concentrate on real time requirements by optimizing seek times. The present invention provides a method and apparatus to place video on disks that results in maximizing data transfer by taking advantage of multiple video streams, video clip access frequency data, and ZBR characteristics of current disk drives.

The present invention also provides an improved process for organizing video data on disk zones based on frequency of access, calculation of the number of streams that can be supported by the transfer rate of a disk zone based on stream rates, collecting frequency of access data for use in data placement, migration of data into the most effective zone as usage changes. The presently claimed invention can be applied to a number of different storage devices including magnetic disks, optical disks, and RAID devices.

While the invention has been particularly shown and described with reference to a preferred embodiment, it will be understood by those skilled in the art that various changes in form and detail may be made therein without departing from the spirit and scope of the invention.

What is claimed is:

1. A method for storing data entries on a storage device comprising:

identifying a plurality of zones, wherein each of the plurality of zones has a different data transfer rate;

identifying a transfer rate for each of the plurality of zones;

copying a first table containing information for each of the data entries to a second table;

sorting the information in the second table based on demand for each of the data entries and the data transfer rate of the plurality of zones; and storing the data entries in a zone based on a transfer rate of the zone and the demand for the data entries, wherein storing the data entries updates the information in the first table to reflect the storing of the data entries.

2. The method of claim 1, further comprising:

identifying a zone in the plurality of zones having a greatest data transfer rate; and storing a selected data entry that is accessed most often in the identified zone, wherein time to transfer the selected data entry is minimized.

3. The method of claim 1, further comprising:

identifying a zone in the plurality of zones having a slowest data transfer rate; and storing a selected data entry that is accessed least often in the identified zone.

4. The method of claim 1, wherein a plurality of videos are stored on the storage device and further comprising:

identifying a change in demand for a video in the plurality of videos, wherein the video is stored in a first zone having a first data transfer rate; and moving the video to a second zone having a second data transfer rate in response to the change in demand for the video.

5. The method of claim 4, wherein the moving step comprises moving the video to the second zone, wherein the second data transfer rate is lower than that of the first data transfer rate in response to a change in demand for the video that is a decrease in demand for the video.

6. The method of claim 4, wherein the moving step comprises moving the video to a second zone, wherein the second data transfer rate is higher than the first data transfer rate in response to the change in demand for the video that is an increase in demand for the video.

7. The method of claim 1, wherein the information for each of the data entries includes the location of the data entries on the storage device.

8. The method of claim 1, wherein the information for each of the data entries includes the transfer rate for each zone which contains a particular one of the data entries.

9. The method of claim 1, wherein the information for each of the data entries includes the access time for each zone which contains a particular one of the data entries.

10. A method for storing a plurality of videos on a storage device having a plurality of different zones, wherein each zone has different data transfer rate, the method comprising:
   identifying a zone in the plurality of zones having a greatest data transfer rate;
   copying a first table containing information for each of the plurality of videos to a second table;
   sorting the information in the second table based on demand for each of the plurality of videos and the data transfer rate of the plurality of different zones;
   retrieving a selected video that is most frequently accessed from the second table; and
   storing the selected video that is most frequently accessed in the identified zone, wherein time to transfer the data is minimized and the number of video data streams is maximized, and wherein storing the selected video that is most frequently accessed updates the information in the first table to reflect the storing of the selected video.

11. The method of claim 10, further comprising:
   identifying a second zone in the plurality of zones having a smallest data transfer rate;
   retrieving a selected video that is least frequently accessed from the second table; and
   storing the selected video that is least frequently accessed in the second zone, wherein storing the selected video that is least frequently accessed updates the information in the first table to reflect the storing of the selected video.

12. A method for managing a plurality of videos stored on a storage device having a plurality of different zones, wherein each zone has a different data transfer rate, the method comprising:
   identifying a change in demand for a selected video in the plurality of videos, wherein the selected video is stored in a first zone having a first data transfer rate;
   copying a first table containing information for each of the plurality of videos to a second table;
   sorting the information in the second table based on demand for each of the plurality of videos and the data transfer rate of the plurality of different zones; and
   moving the selected video to a second zone having a second data transfer rate in response to the change in demand for the selected video, wherein storing the selected video updates the information in the first table to reflect the storing of the selected video.

13. The method of claim 12, wherein the moving step comprises moving the selected video to the second zone, wherein the second data transfer rate is lower than that of the first data transfer rate in response to a change in demand for the selected video that is a decrease in the demand for the selected video.

14. The method of claim 12, wherein the moving step comprises moving the selected video to a second zone, wherein the second data transfer rate is higher then the first data transfer rate in response to the change in demand for the selected video that is an increase in demand for the selected video.

15. A data processing system including a storage device, the data processing system comprising:
   first identifying means for identifying a plurality of zones, wherein each of the plurality of zones has a different data transfer rate;
   second identifying means for identifying a zone in the plurality of zones having a greatest data transfer rate;
   copying means for copying a first table containing information for each of a plurality of data entries to a second table;
   sorting means for sorting the information in the second table based on demand for each of the plurality of data entries and the data transfer rate of the plurality of zones; and
   storage means for storing a selected data entry that is accessed most often in the identified zone, wherein time to transfer the data is minimized, and wherein the storage means updates the information in the first table to reflect the storing of the selected data entry.

16. The data processing system of claim 15, further comprising:
   third identifying means for identifying a zone in the plurality of zones having a smallest data transfer rate; and
   second storage means for storing a second selected data entry that is least often accessed in the identified zone having the least data transfer rate.

17. The data processing system of claim 15, wherein the storage means is a disk drive.

18. The data processing system of claim 15, wherein the storage means is a disk array.

19. The data processing system of claim 15, wherein the information for each of the plurality of data entries includes the location of each of the plurality of data entries on the storage device.

20. The data processing system of claim 15, wherein the information for each of the plurality of data entries includes the transfer rate for each zone which contains a particular one of the data entries.

21. The data processing system of claim 15, wherein the information for each of the plurality of the data entries includes the access time for each zone which contains a particular one of the data entries.

22. A data processing system including a storage device having a plurality of different zones wherein a plurality of videos are stored within the data processing system and the data processing system generates video data streams using the plurality of videos, wherein each zone has different data transfer rate, the data processing system comprising:
   identifying means for identifying a zone in the plurality of zones having a greatest data transfer rate;
   copying means for copying a first table containing information for each of the plurality of videos to a second table;

sorting means for sorting the information in the second table based on demand for each of the plurality of videos and the data transfer rate of the plurality of different zones;

retrieving means for retrieving a video that is most frequently accessed from the second table; and storage means for storing the video that is most frequently accessed in the identified zone, wherein a time to transfer the data is minimized and the number of video data streams is maximized, and wherein the storage means updates the information in the first table to reflect the storing of the video that is most frequently accessed.

23. The data processing system of claim 22, wherein data identifying transfer rates for each zone on the storage device is stored on the storage device.

24. The data processing system of claim 23, wherein the storing means uses the stored data to identify a change in demand for the plurality of videos.

25. The data processing system of claim 22, wherein the storage device is a disk drive.

26. The data processing system of claim 22, wherein the storage device comprises a disk array.

27. An apparatus for managing a plurality of videos stored on a storage device having a plurality of different zones, wherein each zone has a different data transfer rate, the apparatus comprising:

identifying means for identifying a change in demand for a selected video in the plurality of videos, wherein the selected video is stored in a first zone having a first transfer rate;

copying means for copying a first table containing information for each of the plurality of videos to a second table;

sorting means for sorting the information in the second table based on demand for each of the plurality of videos and the data transfer rate of the plurality of different zones; and moving means for moving the selected video to a second zone having a second data transfer rate in response to the change in demand for the selected video and wherein the moving means updates the information in the first table to reflect the moving of the selected video.

28. The apparatus of claim 27, wherein moving means comprising means for moving the selected video to a second zone, wherein the second data transfer rate is lower than of the first data transfer rate in response to a change in demand for the selected video that is a decrease in the demand for the selected video.

29. The apparatus of claim 27, wherein the moving means comprises means for moving the selected video to a second zone, wherein the second data transfer rate is higher than the first data transfer rate in response to the change in demand for the selected video that is an increase in demand for the selected video.

30. The apparatus of claim 27, wherein the information for each of the plurality of videos includes the location of each of the plurality of videos on the storage device.

31. The apparatus of claim 27, wherein the information for each of the plurality of videos includes the transfer rate for each zone which contains a particular one of the videos.

32. The apparatus of claim 27, wherein the information for each of the plurality of videos includes the access time for each zone which contains a particular one of the videos.

33. A distributed data processing system comprising:

a communications network;

a plurality of user systems connected to the communications network;

a data processing system connected to the communications network, the data processing system including a storage device for storing videos, wherein the storage device includes a plurality of zones;

identifying means for identifying a data transfer rate for each of the plurality of zones;

copying means for copying a first table containing information for each of the videos to a second table;

sorting means for sorting the information in the second table based on demand for each of the videos and the data transfer rate of the plurality of zones; and storage means for storing the videos in a zone within the plurality of zones based on the transfer rate of the zone, wherein the storage means updates the information in the first table to reflect the storing of the videos.

34. The distributed data processing system of claim 33, wherein the storage means further includes:

identifying means for identifying a change in demand for a selected video, wherein the selected video is stored in a first zone in the plurality of zones having a first transfer rate; and moving means for moving the selected video to a second zone in the plurality of zones having a second data transfer rate in response to a change in demand for the selected video.

35. The distributed data processing system of claim 34, wherein the moving means comprises means for moving the selected video to second zone, wherein the second data transfer rate is lower than the first data transfer rate in response to a change in demand for the selected video that is a decrease in demand for the selected video.

36. The distributed data processing system of claim 34, wherein the moving the means comprises means for moving the selected video to a second zone, wherein the second data transfer rate is higher than the first data transfer rate in response to the change in demand for the selected video that is an increase in demand for the selected video.

37. A storage device encoding data processing executable instructions comprising:

instruction means for identifying a plurality of zones in a second storage device, wherein each of the plurality of zones has a different data transfer rate;

instruction means for identifying a transfer rate for each of the plurality of zones;

instruction means for coping a first table containing information for each of a plurality of data entries to a second table;

instruction means for sorting the information in the second table based on demand for each of the data entries and the data transfer rate of the plurality of different zones;

instruction means for storing a selected data entry in a zone within the plurality of identified zones in the second storage device utilizing the identified transfer rate for the zone, wherein the instruction means for storing updates the information in the first table to reflect the storing of the selected data entry, and wherein the instruction means are activated when the storage device is connected to a data processing system.

38. The storage device of claim 37, wherein the storage device is a disk drive.

39. The storage device of claim 37, wherein the storage device is a read only memory.

40. The storage device of claim 37, wherein the storage device is a floppy disk.

41. The storage device of claim 37, wherein the storage device is a CD ROM.

42. A method for arranging a plurality of videos located on a storage device having a plurality of zones, wherein each zone has different data transfer rate and each of the plurality of videos has a different level of demand, the method comprising:

copying a working table containing information for each of the plurality of videos to a target table, the information for each of the videos including a range of zones where a particular video is stored and the data transfer rate for the range of zones;

sorting the information in the target table based on the level of demand for each of the plurality of videos and the data transfer rate of the plurality of zones, wherein videos with the highest level of demand are associated with zones having the highest transfer rates and videos with the lowest level of demand are associated with zones having the lowest transfer rates;

transferring, in parallel, each of the plurality of videos to the associated zones using the target table; and updating the working table using the sorted information in the target table, wherein the working table contains updated information for the plurality of videos on the storage device.

\* \* \* \* \*

UNITED STATES PATENT AND TRADEMARK OFFICE
CERTIFICATE OF CORRECTION

PATENT NO. : 5,719,983
DATED : February 17, 1998
INVENTOR(S) : Henderson et al.

It is certified that error appears in the above-indentified patent and that said Letters Patent is hereby corrected as shown below:

Column 14, line 50, delete "coping" and substitute --copying--.

Signed and Sealed this

Eighth Day of September, 1998

Attest:

BRUCE LEHMAN

*Attesting Officer*         *Commissioner of Patents and Trademarks*